Sept. 9, 1952          O. OTTERSON          2,609,861

DIES FOR MAKING TRUCK LEVER CONNECTIONS

Filed Jan. 28, 1950          3 Sheets-Sheet 1

INVENTOR.
Oscar Otterson
BY Brown, Critchlow, Flick & Peckham
his Attorneys

Sept. 9, 1952  O. OTTERSON  2,609,861
DIES FOR MAKING TRUCK LEVER CONNECTIONS
Filed Jan. 28, 1950  3 Sheets-Sheet 2

INVENTOR.
Oscar Otterson
BY
Brown, Critchlow, Flick & Peckham
his Attorneys

Sept. 9, 1952              O. OTTERSON              2,609,861
DIES FOR MAKING TRUCK LEVER CONNECTIONS
Filed Jan. 28, 1950                               3 Sheets—Sheet 3
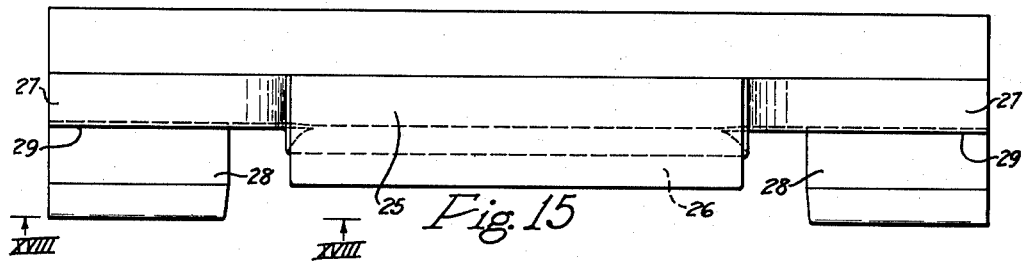
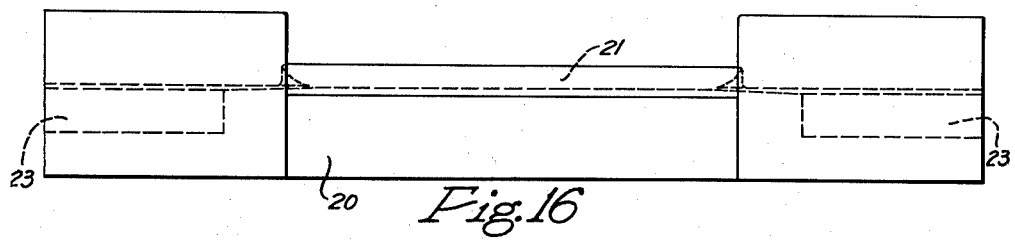
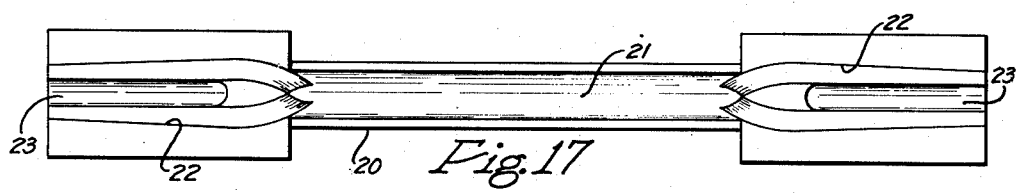
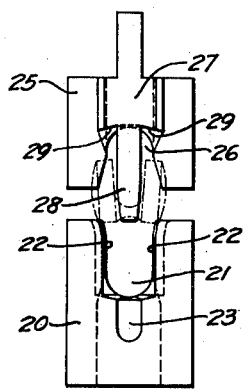 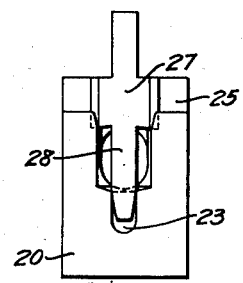 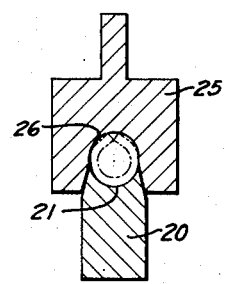
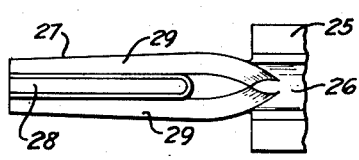
INVENTOR.
Oscar Otterson
BY
Brown, Critchlow, Flick & Peckham
his Attorneys Patented Sept. 9, 1952

2,609,861

UNITED STATES PATENT OFFICE 2,609,861

DIES FOR MAKING TRUCK LEVER CONNECTIONS

Oscar Otterson, Butler, Pa., assignor, by mesne assignments, to Schaefer Equipment Company, Pittsburgh, Pa., a corporation of Pennsylvania Application January 28, 1950, Serial No. 141,105

2 Claims. (Cl. 153—49)

1

The invention relates to railway brake rigging truck lever connections, and to a method and dies for making them.

One way of making truck lever connections of the general type disclosed in Schaefer Patent No. 2,096,068 has been by forging and trimming the opposite ends of a flat metal bar to form a blank having a flat body with a pair of spaced jaws at each end. All of the jaws lie in the same plane and are provided with circular holes perpendicular thereto for later receiving pivot pins extending through brake levers. The blank is reheated and its flat body is formed into tubular shape in two operations by means of dies. This shaping of the body causes the jaws in each pair to be swung around into a position in which they face each other, but as there is no control over them they are not parallel. One pair of jaws then is reheated and placed in a header to properly position them in parallel relation with the holes through them in axial alignment. The same operation then is performed on the other pair of jaws. Consequently, four operations are performed after the original drop forging and trimming that forms the flat blank. Also, the blank has to be reheated three times.

It is among the objects of this invention to provide a method of making truck lever connections in which two of the operations and two of the reheats formerly required can be eliminated, and in which there is good control over the shape of the connection as it is being formed. Another object of the invention is to provide an improved set of dies for making the connection. A still further object is to provide a connection of greater strength and better appearance than heretofore, without increasing its weight.

Figure 1:
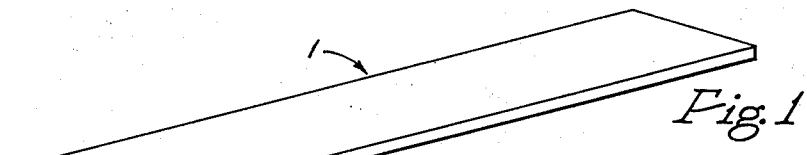
Figure 2:
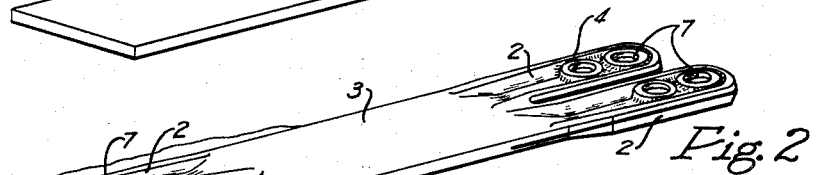
Figure 3:
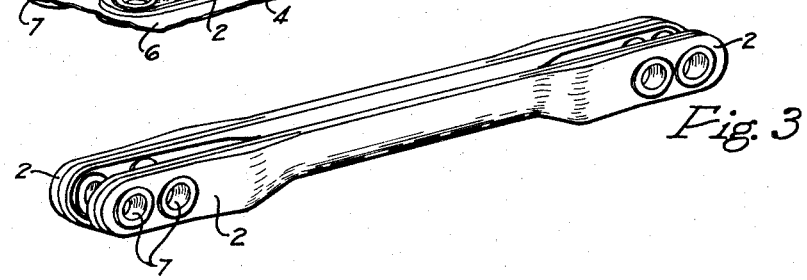
Figure 4:
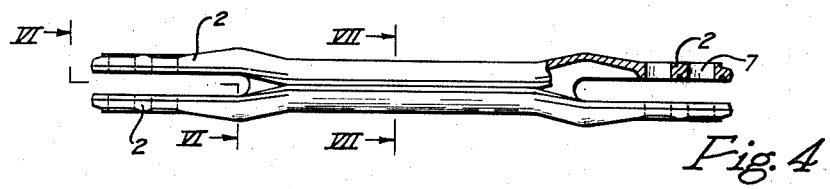
Figure 5:
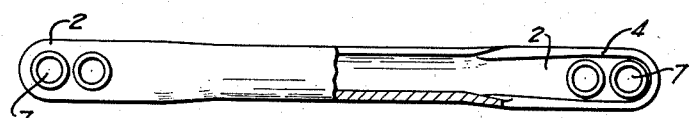
Figure 6:
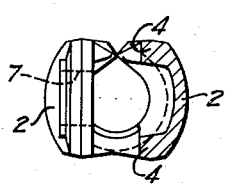
Figure 7:
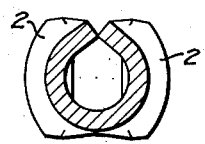
Figure 9:
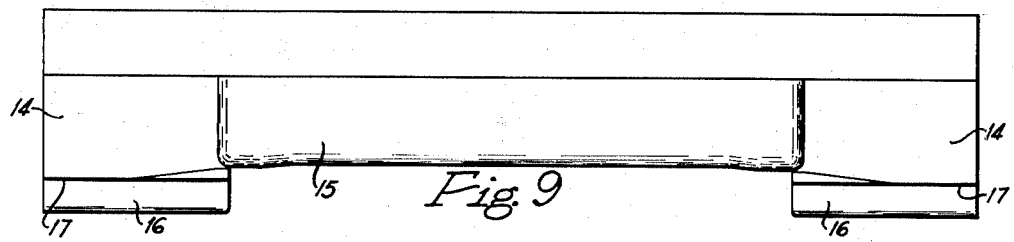
Figure 10:
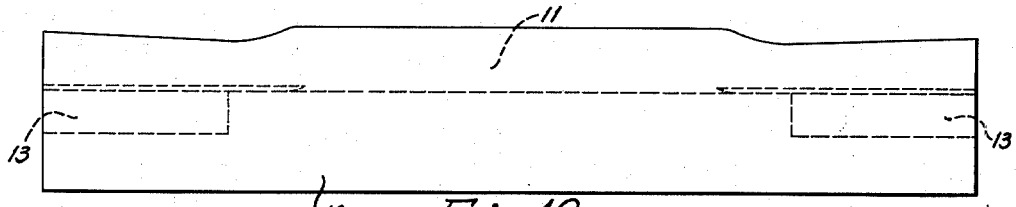
Figure 11:
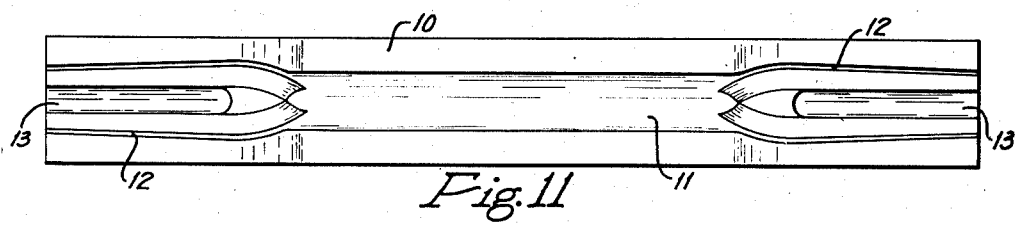
Figure 12:
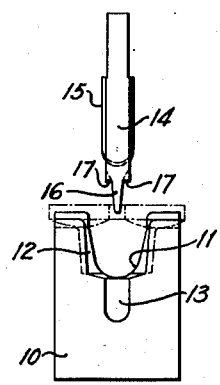
Figure 8:
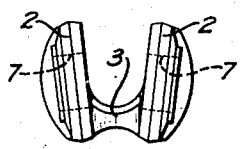

The invention is illustrated in the accompanying drawings, in which Fig. 1 is an isometric view of the metal bar from which the blank is forged; Fig. 2 is an isometric view of the blank forged from the bar, with the flash removed from one end of it; Fig. 3 is an isometric view of the blank after the first folding operation; Fig. 4 is a plan view of a finished connection, with one of the jaws shown in section; Fig. 5 is a side view of the connection, with half of it shown in longitudinal section; Figs. 6 and 7 are enlarged cross sections taken on the lines VI—VI and VII—VII, respectively, of Fig. 4; Fig. 8 is an enlarged end view of the folded blank shown in Fig. 3; Fig. 9 is a side view of the upper die used in the first operation; Figs. 10 and 11 are side and plan views, respectively, of the lower die; Fig. 12 is an end view of the two dies in operating position, with the

Figure 22:
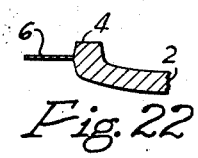
Figure 13:
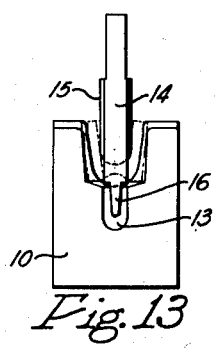
Figure 14:
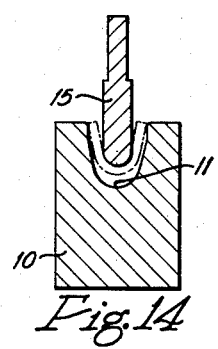

2 forged blank shown in broken lines resting on the lower die; Fig. 13 is an end view of the dies after they have been brought together; Fig. 14 is a central cross section through the dies shown in the preceding figure; Fig. 15 is a side view of upper die used in the second operation; Figs. 16 and 17 are side and plan views, respectively, of the lower die; Fig. 18 is a fragmentary bottom plan view of the upper die taken on the line XVIII—XVIII of Fig. 15; Figs. 19, 20 and 21 show the second operation dies in the same positions in which the first operation dies appear in Figs. 12, 13 and 14; and Fig. 22 is an enlarged fragmentary section taken transversely through the left-hand end portion of the blank shown in Fig. 2.

Referring to the drawings, a relatively thin, rectangular, metal bar 1 is heated at its ends and drop forged to form pairs of laterally spaced jaws 2 extending longitudinally from the opposite ends of a body 3 which remains flat at this time. Some of the metal of the jaws is forced up into U-shape ribs 4 which surround them. The metal between the end portions of each rib is bowed downward and reduced in thickness more than elsewhere so that metal will be provided for increasing the width of the end portions of the ribs as they approach the body of the blank. This is shown best in Figs. 4 and 5. Ribs of this shape strengthen the jaws and thereby help to keep them parallel in the finished connection. Cavities are formed in both the upper and lower forging dies (not shown) in such a manner that the parting line of the dies is between the upper and lower surfaces of the jaws. The jaws therefore project both above and below the flash 6 (Figs. 2 and 22) that is formed around them, and the surfaces directly above and below the flash are inclined away from it. This flash, as well as the flash in the pivot pin holes 7 that are formed in the jaws, has to be removed. Since the flash is not formed at any of the edges of the jaws, those edges can be accurately formed and will not be affected by the flash trimming operation. Clean-cut jaw edges are important in practicing the method disclosed herein. After trimming, the blank is ready to be shaped into a truck lever connection in two steps. After the first step the blank appears as shown in Figs. 3 and 8, while the finished connection is shown in Figs. 4 to 7.

The trimmed flat blank is heated throughout its length and is placed on the lower die 10 shown in Figs. 10 to 14. The top of the die is shaped to conform to the lower surface of the blank shown in Fig. 2. The lower surface of the blank becomes the outer surface of the finished connection. This lower die has a central recess 11 in its top extending lengthwise of it. The central portion of the recess has a transversely curved bottom and upwardly diverging sides. The end portions of the recess have longitudinally concave sides 12 to accommodate the outwardly bulging jaws, and these sides do not diverge upwardly as much as the sides of the central portion of the recess. Between sides 12, the bottom of the recess is provided with downwardly extending slots 13.

After the flat blank has been placed on the lower die, as indicated by broken lines in Fig. 12, it is pressed down into recess 11 by means of an upper die (Figs. 9, 12, 13 and 14) which is relatively thin. The upper die has a flat central portion 15 provided with a transversely rounded lower surface for engaging the flat body 3 of the blank and pressing it down into the lower die, as shown in Fig. 14. The opposite end portions 14 of the upper die are thinner and each has projecting from its bottom a downwardly tapered tongue 16 that extends lengthwise of the die. At the upper end of the tongue there are shoulders 17 extending along its opposite sides. As shown in Figs. 12 and 13, this tongue first passes down between a pair of jaws to keep the blank centered on the lower die, and then the shoulders engage the inner upper edges of the jaws and push them down into the lower die recess as the flat body is pushed down into the recess by the central portion of the upper die. The slots 13 at the ends of the recess receive the tongues. As the jaws are forced down into the lower die they rock and slide on the upper edges of the recess so that the outer edges of the jaws are swung in toward the upper die. As a result, the jaws diverge upwardly like the body of the folded blank, as shown in Figs. 3, 8 and 13.

Immediately after this first folding operation and without reheating the folded blank, it is placed on the lower die 20 (Figs. 16, 17, 19, 20 and 21) used in the second operation. The original position of the blank on the die is shown in broken lines in Fig. 19. The lower die has a relatively thin central portion provided with a recess 21 extending lengthwise along its top. The recess is substantially semicircular in cross section. This recess continues in altered shape through thicker end portions of the die. The opposite sides 22 of the recesses in these end portions are a little farther apart than the upper edges of the rest of the recess, and they are substantially parallel from top to bottom. Sides 22 also are concave lengthwise for the same reason as recess sides 12 in lower die 10, and the bottom of the recess between them is provided with slots 23 extending lengthwise of the die.

The upper die (Figs. 15 and 18 to 21) used in the second operation has a relatively thick central portion 25 provided in its bottom with a longitudinally extending recess 26 that has upwardly converging flat sides connected by a substantially semicylindrical surface, as shown in Fig. 21. The end portions 27 of the die are thinner and have central depending tongues 28 provided with parallel sides terminating at their upper ends in horizontal shoulders 29 extending lengthwise of the die. The thickness of each tongue is equal to the distance that each pair of jaws 2 are to be spaced apart.

After the blank folded in the first operation has been placed on lower die 20, as shown in Fig. 19, the upper die is brought down so that its tongues 28 will pass down between the jaws. At the same time the upper edges of the U-shape body of the blank will be received in recess 26 in the upper die. As the upper die continues to travel down, its shoulders 29 engage the tops of the jaws, and the upper edges of the U-shape body are folded in toward each other, as indicated in broken lines in Fig. 21, to form a tubular body. This happens as the blank is being forced down into the lower die. At the same time the jaws 2 are forced into parallel relation on opposite sides of tongues 28 which can project into the slots 23 in the lower die. The dies then are separated and the finished connection is removed.

Since the flash produced in the original drop forging step does not occur at the edges of jaws 2, they are straight and smooth. This is particularly important for the inner edges which are engaged by shoulders 17 of the upper die in the first operation and by tongues 28 on the upper die in the second operation, because it permits the jaws to be brought into better alignment than heretofore.

The chief advantage of the dies and method disclosed herein is that the jaws of the connection are properly positioned at the same time that the body is shaped. This eliminates the two heading operations that had to be performed on the jaws heretofore, and the two reheating steps immediately preceding the heading operations. The result is increased production and reduction in cost of making the connections.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Cooperating upper and lower dies for shaping a heated metal truck lever connection blank having an elongated body with a pair of longitudinally extending spaced jaws at each end, the lower die being provided in its top with a recess extending lengthwise thereof and having longitudinally extending slots at its opposite ends extending downward from the bottom of the recess, and the upper die having an elongated central portion adapted to engage the body of the blank and press it down into the recess to curve the body transversely, the end portions of the upper die being provided with depending tongues above said slots adapted to pass between the jaws in each pair, and said end portions also having shoulders on opposite sides of the tongues for engaging said jaws to press them down into said recess as said tongues enter said slots.

2. Cooperating upper and lower dies for folding a heated metal truck lever connection blank having a flat body with a pair of longitudinally extending spaced jaws at each end lying in the same plane, the lower die being provided in its top with a longitudinally extending recess and having longitudinally extending slots at its opposite ends extending downward from the bottom of the recess, and the upper die having an elongated central portion adapted to engage the flat body of the blank along its center line and press it down into the recess to form a U-shape body, the end portions of the upper die projecting down below the central portion and being provided with depending tongues above said slots adapted to pass between the jaws in each pair, and said end portions also having shoulders on opposite sides of the tongues for engaging the inner upper edges of said jaws to press them down into said recess and simultaneously turn the jaws into nearly vertical planes as said tongues enter said slots.

OSCAR OTTERSON.

REFERENCES CITED

The following references are of record in the file of this patent:

UNITED STATES PATENTS

| Number | Name | Date |
|---|---|---|
| 383,135 | Mansfield | May 22, 1888 |
| 432,365 | Bowden et al. | July 15, 1890 |
| 612,216 | Rowland | Oct. 11, 1898 |
| 1,270,059 | Schaefer | June 18, 1918 |
| 1,387,199 | Small | Aug. 9, 1921 |
| 1,737,097 | Schachtel | Nov. 26, 1929 |
| 1,760,558 | Klocke | May 27, 1930 |
| 1,936,454 | Klocke | Nov. 21, 1933 |
| 1,947,867 | Mebold | Feb. 20, 1934 |
| 1,950,726 | Graybill | Mar. 13, 1934 |
| 1,959,670 | Hamilton | May 22, 1934 |
| 2,458,202 | Robertson | Jan. 4, 1949 |
| 2,458,989 | George | Jan. 11, 1949 |